United States Patent
Yang et al.

(10) Patent No.: US 11,803,155 B2
(45) Date of Patent: Oct. 31, 2023

(54) METHOD AND APPARATUS FOR GENERATING COMPUTER-GENERATED HOLOGRAM

(71) Applicant: SAMSUNG ELECTRONICS CO., LTD., Suwon-si (KR)

(72) Inventors: Daeho Yang, Suwon-si (KR); Sunil Kim, Seoul (KR); Wontaek Seo, Yongin-si (KR); Geeyoung Sung, Daegu (KR); Bongsu Shin, Seoul (KR); Jungkwuen An, Suwon-si (KR); Jangwoo You, Seoul (KR); Changkun Lee, Seoul (KR); Jong-Young Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 335 days.

(21) Appl. No.: 17/331,198

(22) Filed: May 26, 2021

(65) Prior Publication Data
US 2022/0057750 A1 Feb. 24, 2022

(30) Foreign Application Priority Data

Aug. 20, 2020 (KR) .................. 10-2020-0104805
Mar. 30, 2021 (KR) .................. 10-2021-0041261

(51) Int. Cl.
*G03H 1/22* (2006.01)
*G06T 7/55* (2017.01)

(52) U.S. Cl.
CPC ............ *G03H 1/2202* (2013.01); *G06T 7/55* (2017.01); *G03H 2226/02* (2013.01); *G06T 2207/20056* (2013.01)

(58) Field of Classification Search
None
See application file for complete search history.

(56) References Cited

U.S. PATENT DOCUMENTS

| 8,575,514 B2 | 11/2013 | Matsumoto et al. |
| 2008/0192312 A1 | 8/2008 | Hendricks et al. |

(Continued)

FOREIGN PATENT DOCUMENTS

| JP | 2012238012 A | 12/2012 |
| KR | 100692876 B1 | 3/2007 |
| KR | 1020080074785 A | 8/2008 |

OTHER PUBLICATIONS

Communication dated Jan. 21, 2022 issued by the European Patent Office in application No. 21189903.4.

(Continued)

*Primary Examiner* — James A Thompson
(74) *Attorney, Agent, or Firm* — Sughrue Mion, PLLC

(57) ABSTRACT

Disclosed are a method and a system for processing a computer-generated hologram (CGH). The system for processing a CGH includes a CGH generation apparatus and a display apparatus. The CGH generation apparatus repeatedly performs a process of propagating object data from a first depth layer to a second depth layer, changing amplitude data of the object data to second predefined amplitude data, back-propagating the object data from the second depth layer to the first depth layer, and changing the amplitude data of the object data to first predefined amplitude data, and generates a CGH by using the object data.

19 Claims, 23 Drawing Sheets

(56) References Cited

U.S. PATENT DOCUMENTS

| | | |
|---|---|---|
| 2015/0234351 A1 | 8/2015 | Alon-Braitbart et al. |
| 2019/0033782 A1* | 1/2019 | Gulses et al. |
| 2020/0192286 A1* | 6/2020 | Oh .................. G03H 1/0808 |
| 2021/0149340 A1* | 5/2021 | Oh .................. G03H 1/2249 |
| 2021/0223738 A1* | 7/2021 | Futterer ............. G03H 1/268 |
| 2023/0089872 A1* | 3/2023 | Akao .................. G06T 15/50 |
| | | 345/421 |

OTHER PUBLICATIONS

Makowski, M., et al., "Design and applications of multi-plane Fresnel color holograms", Proceedings of Spie, vol. 7141, Nov. 20, 2008, XP009142613, 7 pages.

Bräuer, R., et al., "Diffusers in digital holography", Journal of Optical Society of America, vol. 8, No. 3, Mar. 1991, pp. 572-578.

Wyrowski, F., et al., "Iterative Fourier-transform algorithm applied to computer holography", Journal of Optical Society of America, vol. 5, No. 7, Jul. 1988, pp. 1058-1065.

* cited by examiner

FIG. 8B
FIG. 8C
FIG. 8E
FIG. 8D

METHOD AND APPARATUS FOR GENERATING COMPUTER-GENERATED HOLOGRAM

CROSS-REFERENCE TO RELATED APPLICATION

This application is based on and claims priority under 35 U.S.C. § 119 to Korean Patent Application No. 10-2020-0104805, filed on Aug. 20, 2020, and Korean Patent Application No. 10-2021-0041261, filed on Mar. 30, 2021, in the Korean Intellectual Property Office, the disclosures of which are incorporated by reference herein in their entirety.

BACKGROUND

1. Field

The disclosure relates to a method and a system for processing a computer-generated hologram (CGH).

2. Description of Related Art

Holography is a 3D space representing technology to reproduce an object in a 3D space by adjusting the amplitude and phase of light. Accordingly, a user may have an unrestricted view and may not experience 3D visual fatigue. Therefore, devices that realize high-resolution holographic images in real-time by using a complex spatial light modulator (SLM) capable of simultaneously controlling the amplitude and phase of light have been developed. A hologram may be displayed in a 3D space by using an interference pattern formed between an object wave and a reference wave. Recently, computer-generated holography that may provide a hologram on a flat panel display by processing an interference pattern for reproducing a hologram has been utilized. In a method of generating a digital hologram, for example, a computer-generated holography method, a hologram is generated by approximating optical signals and computing an interference pattern generated by mathematical calculations based on the approximated optical signals. In the method for generating a digital hologram, since an object consists of a set of various data such as 3D points, polygons, or depth data, a completed hologram is generated by calculating pieces of object data constituting the object.

SUMMARY

Provided are a method and a system for processing a computer-generated hologram (CGH). The objectives of the disclosure are not limited to the technical objects described above, and other technical objects may be inferred from the following embodiments.

Additional aspects will be set forth in part in the description which follows and, in part, will be apparent from the description, or may be learned by practice of embodiments of the disclosure.

In accordance with an aspect of the disclosure, a method for processing a computer-generated hologram (CGH) includes obtaining a first object image corresponding to a first depth layer and a second object image corresponding to a second depth layer; determining first predefined amplitude data based on the first object image and second predefined amplitude data based on the second object image; generating first object data including the first predefined amplitude data and randomized first phase data; and performing a propagation process using the first object data as an input, the propagation process including propagating the first object data to the second depth layer to obtain second object data including second amplitude data and second phase data; replacing the second amplitude data with the second predefined amplitude data to obtain changed second object data; back-propagating the changed second object data to the first depth layer to obtain changed first object data including changed first amplitude data and changed first phase data; and replacing the changed first amplitude data included in the changed first object data with the first predefined amplitude data to obtain final first object data, wherein the method further includes generating a CGH based on the final first object data; and displaying a first holographic image including the first predefined amplitude data and a second holographic image including the second predefined amplitude data based on the CGH.

The method may further include performing the propagation process a predefined number of times using the final first object data of a preceding iteration of the propagation process as the input before the generating of the CGH.

The propagation process may further include determining a difference between the changed first amplitude data and the first predefined amplitude data; and repeating the propagation process using the final first object data of a preceding iteration of the propagation process as the input based on the determined difference being greater than or equal to a predefined threshold value.

The propagation process may further include determining a difference between the changed second amplitude data and the second predefined amplitude data; and repeating the propagation process using the final first object data of a preceding iteration of the propagation process as the input based on the determined difference being greater than or equal to a predefined threshold value.

The propagating of the first object data may include performing a fast Fourier transform (FFT) on the first object data, and the back-propagating of the changed second object data may include performing an inverse FFT on the changed second object data.

The obtaining of the first object image and the second object image may include obtaining the first object image of a first object; and obtaining the second object image of a second object different from the first object.

The obtaining of the first object image and the second object image may include obtaining the first object image; and obtaining the second object image by changing values of pixels of the first object image.

The obtaining of the first object image and the second object image may include obtaining the first object image in which an object is located within a predefined depth of field; and obtaining the second object image in which the object is located outside the predefined depth of field.

The displaying of the first holographic image and the second holographic image may include displaying, on the first depth layer, the first holographic image having the first predefined amplitude data; and displaying, on the second depth layer, the second holographic image having the second predefined amplitude data.

A non-transitory computer-readable recording medium may have recorded thereon a program for executing the method of an above-noted aspect of the disclosure on a computer.

In accordance with an aspect of the disclosure, a system for processing a computer-generated hologram (CGH) includes a CGH generation apparatus configured to generate a CGH; and a display apparatus configured to display the CGH, wherein the CGH generation apparatus is further configured to obtain a first object image corresponding to a first depth layer and a second object image corresponding to a second depth layer, determine first predefined amplitude data based on the first object image and second predefined amplitude data based on the second object image, generate first object data including the first predefined amplitude data and randomized first phase data, and perform a propagation using the first object data as an input, wherein the propagation includes propagating the first object data to the second depth layer to obtain second object data including second amplitude data and second phase data; replacing the second amplitude data with the second predefined amplitude data to obtain changed second object data; back-propagating the changed second object data to the first depth layer to obtain changed first object data including changed first amplitude data and changed first phase data; and replacing the changed first amplitude data included in the changed first object data with the first predefined amplitude data to obtain final first object data, and wherein the CGH generation apparatus is further configured to generate the CGH based on the final first object data, and display a first holographic image including the first predefined amplitude data and a second holographic image including the second predefined amplitude data by using the CGH.

The CGH generation apparatus may be further configured to perform the propagation a predefined number of times using the final first object data of a preceding iteration of the propagation as the input before the generating of the CGH.

The propagation may further include determining a difference between the changed first amplitude data and the first predefined amplitude data; and repeating the propagation using the final first object data of a preceding iteration of the propagation as the input based on the determined difference being greater than or equal to a predefined threshold value.

The propagation may further include determining a difference between the changed second amplitude data and the second predefined amplitude data; and repeating the propagation using the final first object data of a preceding iteration of the propagation as the input based on the determined difference being greater than or equal to a predefined threshold value.

The propagating of the first object data may include performing a fast Fourier transform (FFT) on the first object data, and the back-propagating of the changed second object data may include performing an inverse FFT on the changed second object data.

The CGH generation apparatus may be further configured to obtain the first object image of a first object, and obtain the second object image of a second object different from the first object.

The CGH generation apparatus may be further configured to obtain the first object image, and obtain the second object image by changing values of pixels of the first object image.

The CGH generation apparatus may be further configured to obtain the first object image in which an object is located within a predefined depth of field, and obtain the second object image in which the object is located outside the predefined depth of field.

The display apparatus may be further configured to display, on the first depth layer, the first holographic image including the first predefined amplitude data, and display, on the second depth layer, the second holographic image including the second predefined amplitude data.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A-8E are diagrams for explaining a method of obtaining a phase of object data according to an embodiment;

DETAILED DESCRIPTION

Figure 1:
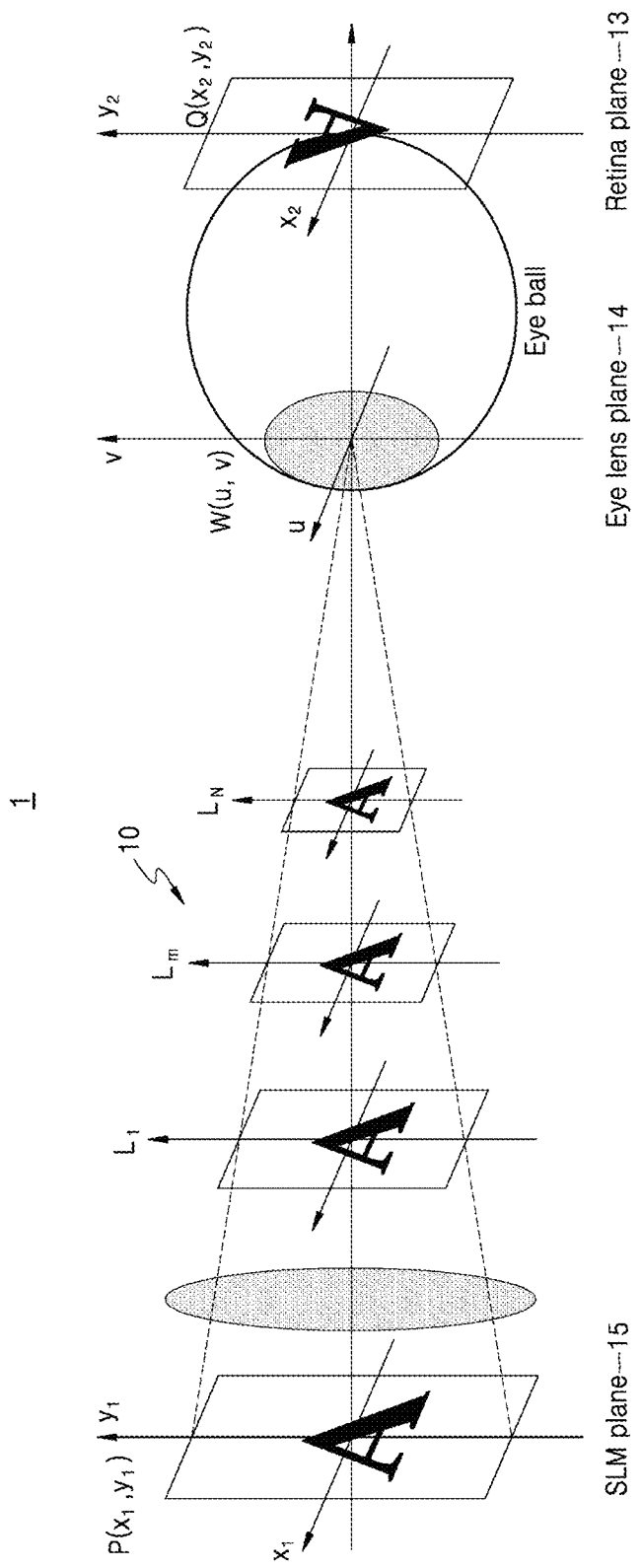
FIG. 1 is a diagram for explaining the principle of computer-generated holography according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

With respect to the terms used in embodiments, general terms currently and widely used are selected, however, the terms may vary according to an intention of a technician practicing in the art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but should be defined based on meanings of the terms and overall contents of the disclosure.

The terms, "include(s)" or "comprise(s)" should not be interpreted or understood as including, without exception, all of the plurality of elements or the plurality of operations disclosed in the description, and it should be understood that some of the elements or some of the operations may not be included, or that additional components or operations may be further included.

Hereinafter, embodiments will be described in detail with reference to the accompanying drawings. However, the disclosure may be implemented in various manners, and is not limited to one or more embodiments described herein.

FIG. 1 is a diagram for explaining a principle of computer-generated holography according to an embodiment.

An observer may recognize an object in a space through the observer's eye ball. The observer may see the object in the space as light reflected from the object is refracted through an eye lens on the front of the eye ball and condensed on a retina on the back side of the eye ball. Using this principle, the principle of computer-generated holography may be implemented.

When the focus of the observers eye lens plane W(u,v) 14 corresponds to a depth layer L1, LM or LN, it may be assumed that an image on the depth layer L1, LM or LN has an imaging focus on a retina plane Q(x2, y2) 13. Then, a complex light wave field in a spatial light modulator (SLM) plane (or referred to as 'CGH plane') P(x1, y1) 15 may be calculated by back-propagating the image, formed on the retina plane 13, to the SLM plane (or CGH plane) 15, and thus, a CGH interference pattern for expressing a CGH at the CGH plane may be obtained.

Computer-generated holography may be classified into a point cloud method, a polygon method, a depth map (or layer-based) method, and so forth. In the point cloud method, a surface of an object is expressed with a number of points and an interference pattern at each point is calculated, and thus, a precise depth may be expressed, whereas the amount of computation greatly increases according to the number of points. In the polygon method, a surface of an object is expressed as polygon meshes and an interference pattern at each polygon mesh is calculated, and thus, the amount of computation is small even though the precision of the object is reduced. The depth map method is a layer-based method and a method of generating a CGH using a 2D intensity image and depth data, and the amount of computation may be determined according to the resolution of an image.

Since in depth map method, a CGH is generated after modeling by approximating an object into multi-depth using depth layers, the efficiency of calculation may be higher than that of other methods. Also, a CGH may be generated by using only 2D intensity information and depth information such as a general picture.

In the generation of a CGH by using the depth map method, most of the computer-generated holography processing is occupied by Fourier transform operations. It is obvious to those of skill in the art that Fourier transform in the processing is an operation for obtaining a distribution of diffracted images obtained by Fresnel diffraction of an image and corresponds to generalized Fresnel transform (GFT) or Fresnel transform. In embodiments, the Fourier transform may include a fast Fourier transform (FFT), a GFT, a Fresnel transform, and so forth, which are operations using the Fourier transform.

Figure 2A:
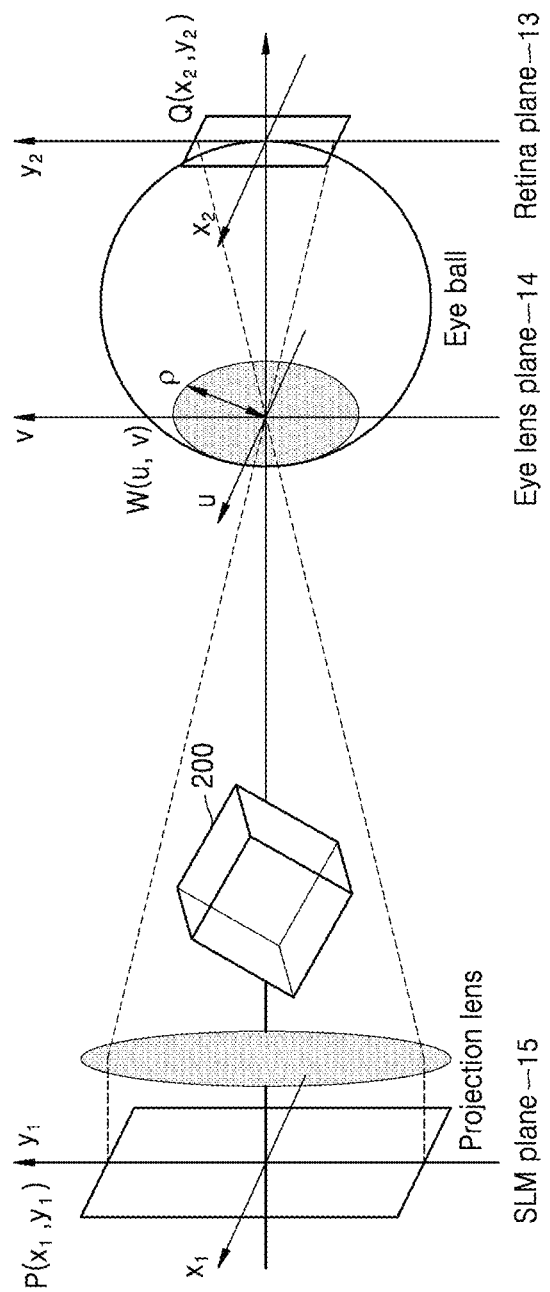
FIGS. 2A and 2B are diagrams for explaining 2D images for each depth layer of an object, when generating a computer-generated hologram (CGH) of the object by using a depth map method, according to an embodiment.
Figure 2B:
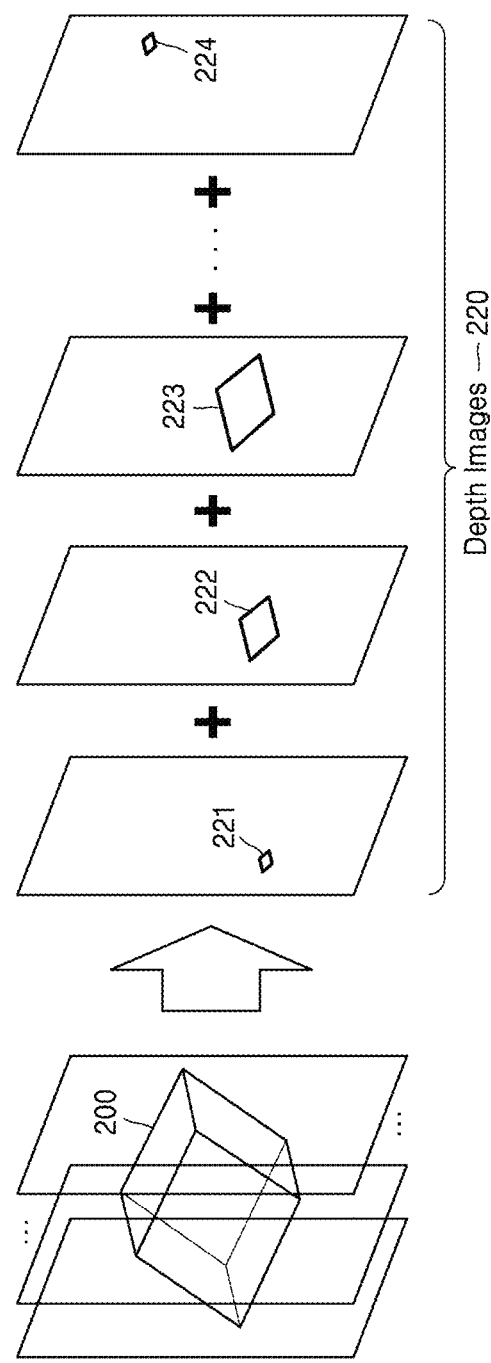

FIGS. 2A and 2B are diagrams for explaining 2D images for each depth layer for an object, when generating a CGH of the object by using a depth map method, according to an embodiment.

Referring to FIG. 2A, an object 200 is located in a space between an eye lens plane W(u,v) 14 and an SLM plane (or CGH plane) P(x1, y1) 15. According to the depth map scheme, this space may be set to be divided into a predefined number of depth layers. Here, the number of depth layers may be any number that may be changed by a user setting, for example, the number of depth layers may be 256 or another number.

Referring to FIG. 2B, the object 200 may be modeled as depth images 220 corresponding to a predefined number of depth layers. Each of the depth images includes object data 221 to 224 of the object 200 at a corresponding depth with respect to the eye lens plane W(u,v) 14. In an embodiment, the object data 221 to 224 include information about an amplitude and phase of light for representing the object 200 at the corresponding depth.

Figure 3A:
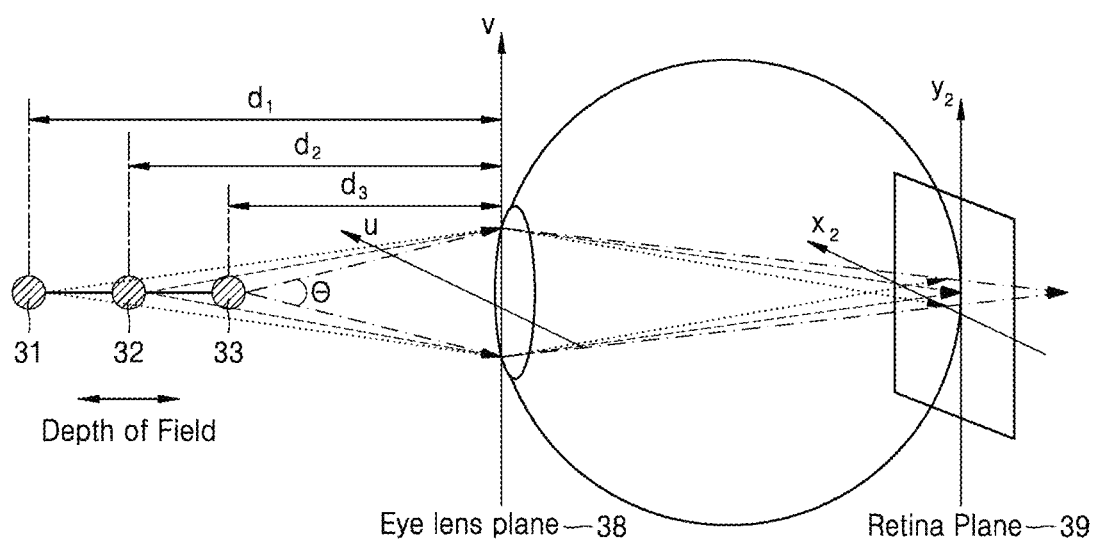
FIGS. 3A and 3B are diagrams for explaining depths of field of a Lambertian surface and a CGH according to an embodiment.
Figure 3B:
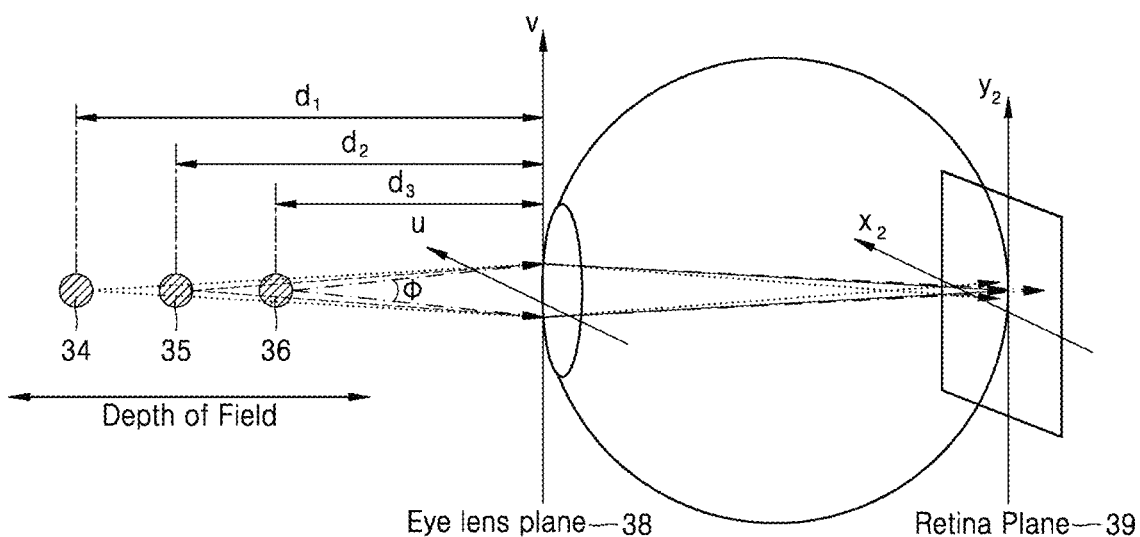

FIGS. 3A and 3B are diagrams for explaining depths of field of a Lambertian surface and a CGH according to an embodiment.

A depth of field (DoF) is a region where a focus is sharply captured. The depth of field is a region around an object that appears sharper when the focus of an eye lens plane 38 corresponds to the object.

In order to compare a depth of field fora Lambertian surface and a depth of field for a CGH, distances d1, d2, and d3 by which objects (or pixels) 31 to 33 corresponding to Lambertian surfaces are spaced apart from the eye lens plane 38 are set to be equal to distances d1, d2, and d3 by which objects (or pixels) 34-36 of CGHs are spaced apart from the eye lens plane 38.

Referring to FIG. 3A, the objects 31-33 having the Lambertian surfaces may emit or reflect light in all directions. That is, the objects 31 to 33 having the Lambertian surfaces may emit light at a sufficient angle $\theta$ to be incident upon and pass through the entire eye lens. When the focus of the eye lens plane 38 corresponds to the object 32, an imaging focus of each light emitted from the other objects 31 and 33 is formed in a region outside a retina plane 39. Accordingly, the object 32 appears sharper and the other objects 31 and 33 appear blurred, such that the observer may clearly recognize depths of the objects 31-33.

Referring to FIG. 3B, the objects 34-36 of the CGH emit light in limited directions. That is, the objects 34-36 of the CGH may emit light at a limited angle $\varphi$ to be incident upon and pass through only a portion of the eye lens.

When the focus of the eye lens plane 38 corresponds to the object 35, an imaging focus of each light emitted from the other objects 34 and 36 is formed in or near the retina plane 39. Accordingly, the objects 34 and 36 appear sharp, even though they are spaced from the eye lens plane 38 by the same distances as those between the objects 31 and 33 and the eye lens plane 38, respectively. Thus, the observer may not clearly recognize depths of the objects 34-36.

As described above, since the depth of field for a CGH may be lower than that for a Lambertian surface, the observer may not recognize a depth of a holographic image.

Figure 4A:
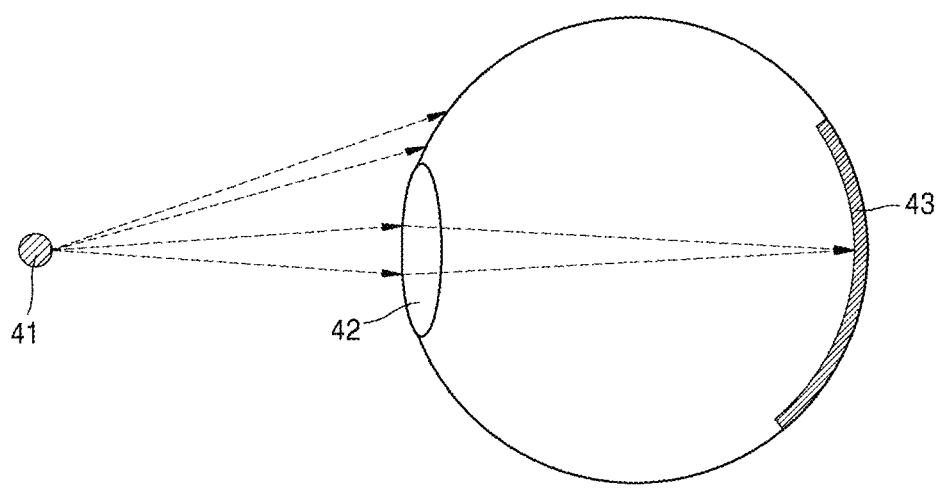
FIGS. 4A and 4B are diagrams for explaining a holographic image generated using a random phase according to an embodiment.
Figure 4B:
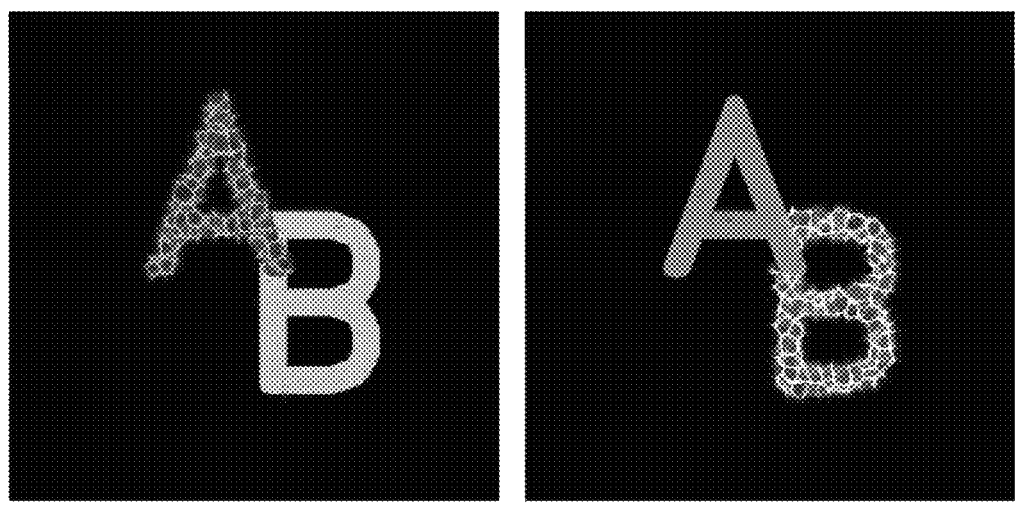

FIGS. 4A and 4B are diagrams for explaining a holographic image generated using a random phase according to an embodiment.

Referring to FIG. 4A, in order to increase the depth of field for the CGH, light emitted from an object (or a pixel) 41 may be randomly scattered based on a randomized phase. In other words, the direction of light emitted at the pixel 41 may be randomized according to the random phase. Since some of the randomly scattered light may not pass through an eye lens 42 and may not be formed in a retina 43, black spots may appear in a holographic image as shown in FIG. 4B. In addition, since the light may be randomly scattered, when the focus of the eye lens 42 does not correspond to the object 41, the extent to which the object 41 appears blurred may be irregular.

Figure 5:
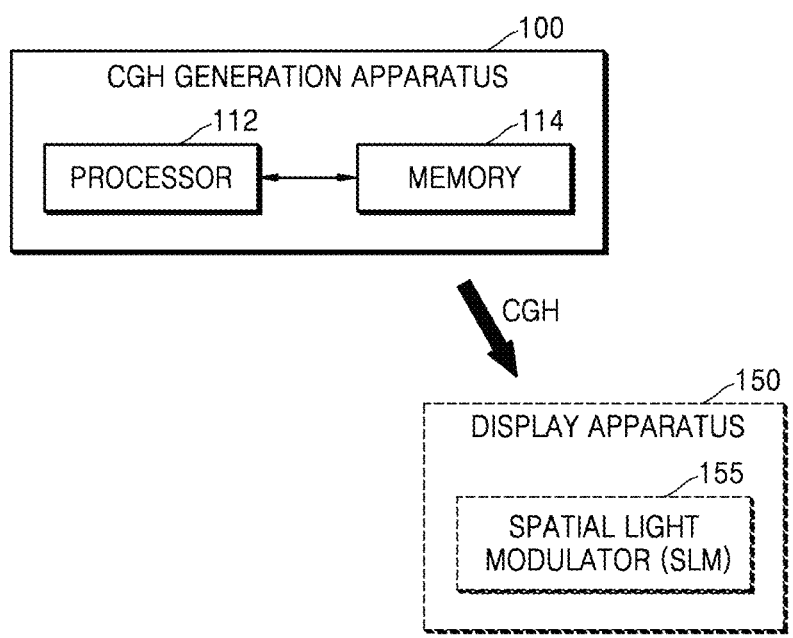
FIG. 5 is a block diagram illustrating a system for processing a CGH according to an embodiment.

FIG. 5 is a block diagram illustrating a system for processing a CGH according to an embodiment.

Referring to FIG. 5, a system 10 for processing a CGH may include a CGH generation apparatus 100 and a display apparatus 150. The CGH generation apparatus 100 may include a processor 112 and a memory 114. In the CGH generation apparatus 100 shown in FIG. 5, only components related to embodiments are shown. Therefore, it is obvious to those of skill in the art that the CGH generation apparatus 100 may further include other general-purpose components in addition to the components shown in FIG. 5.

The processor 112 may correspond to a processor provided in various types of computing devices such as a personal computer (PC), a server device, a television (TV), a mobile device (a smartphone, a tablet device, etc.), an embedded device, an autonomous vehicle, a wearable device, an augmented reality (AR) device, and an Internet of things (IoT) device. For example, the processor 112 may correspond to a processor such as a central processing unit (CPU), a graphics processing unit (GPU), an application processor (AP), or a neural processing unit (NPU), but is not limited thereto.

The processor 112 performs overall functions for controlling the CGH generation apparatus 100. The processor 112 may control the CGH generation apparatus 100 by executing programs stored in the memory 114. For example, in the case where the CGH generation apparatus 100 is provided in the display apparatus 150, the processor 112 may control the display of a holographic image by the display apparatus 150 by controlling image processing by the CGH generation apparatus 100.

The display apparatus 150 may correspond to a device capable of displaying a holographic image in a 3D space based on a CGH generated by the CGH generation apparatus 100. The display apparatus 150 may include a hardware module for reproducing a hologram, such as a spatial light modulator (SLM) 155, and may include various types of display panels such as an LCD and an OLED. That is, the display apparatus 150 may include various hardware modules and hardware configurations for displaying a holographic image, in addition to the CGH generation apparatus 100. The CGH generation apparatus 100 may be a separate independent apparatus implemented outside the display apparatus 150. In this case, the display apparatus 150 may receive CGH data generated by the CGH generation apparatus 100 implemented outside the display apparatus 150, and may display a holographic image based on the received CGH data. However, the implementation manner of the CGH generation apparatus 100 and the display apparatus 150 is not limited by any one embodiment.

The memory 114 is hardware that stores various pieces of data processed in the processor 112, and for example, the memory 114 may store CGH data processed by the processor 112 and CGH data to be processed. In addition, the memory 114 may store various applications to be executed by the processor 112, such as hologram reproducing applications, web browsing applications, game applications, video applications, and so forth.

The memory 114 may include at least one of volatile memory and nonvolatile memory. The nonvolatile memory includes read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM) and so forth. The volatile memory includes dynamic RAM (DRAM), static RAM (SRAM), synchronous DRAM (SDRAM), phase-change RAM (PRAM), magnetic RAM (MRAM), resistive RAM (RRAM), ferroelectric RAM (FRAM), and so forth. In an embodiment, the memory 114 may include at least one of a hard disk drive (HDD), a solid state drive (SSD), a compact flash (CF), a secure digital (SD), a micro-secure digital (Micro-SD), a mini-secure digital (mini-SD), an extreme digital (xD), or a memory stick.

The processor 112 may determine a phase value of object data in any one depth layer such that an amplitude value of object data in another depth layer may satisfy a target amplitude value.

The processor 112 may obtain target amplitude values of object data in a plurality of depth layers from a plurality of 2D images that are pre-generated. For example, first and second target amplitude values of the object data in first and second depth layers may be obtained from first and second 2D images, respectively.

The processor 112 may then set an initial amplitude value of the object data in the first depth layer to the first target amplitude value, and may set an initial phase value of the object data in the first depth layer to an arbitrary phase value.

The processor 112 may obtain an amplitude value and a phase value of the object data in the second depth layer by propagating the object data from the first depth layer to the second depth layer. The processor 112 may change the amplitude value of the object data in the second depth layer to the second target amplitude value.

The processor 112 may then obtain an amplitude value and a phase value of the object data in the first depth layer by back-propagating the object data from the second depth layer to the first depth layer. The processor 112 may change the amplitude value of the object data in the first depth layer to the first target amplitude value.

The processor 112 may then obtain a final phase value of the object data by repeatedly performing the processes of propagating and back-propagating the object data between the first depth layer and the second depth layer. In addition, the processor 112 may obtain the final amplitude value of the object data from the first target amplitude value.

The processor 112 may set the amplitude value and the phase value of the object data in the first depth layer to a final amplitude value and the final phase value, respectively. The processor 112 may generate a CGH by using the object data in the first depth layer.

The processor 112 may be configured to generate a first object image corresponding to the first depth layer, and a second object image corresponding to the second depth layer.

The processor 112 may be configured to determine first predefined amplitude data based on the first object image, and second predefined amplitude data based on the second object image.

The processor 112 may be configured to generate first object data including the first predefined amplitude data and randomized first phase data.

The processor 112 may be configured to perform a propagation process by using the first object data as input data. The propagation process may include propagating the first object data to the second depth layer to obtain second object data including second amplitude data and second phase data, changing the second amplitude data to the second predefined amplitude data to obtain changed second object data, back-propagating the changed second object data to the first depth layer to obtain changed first object data including changed first amplitude data and changed first phase data, and changing, to the first predefined amplitude data, the changed first amplitude data included in the changed first object data to obtain final first object data. The processor 112 may be configured to generate a CGH based on the final first object data.

The display apparatus 150 may be configured to display a holographic image having the first predefined amplitude data and the second predefined amplitude data (i.e., a first holographic image and a second holographic image), by using the generated CGH.

Figure 6A:
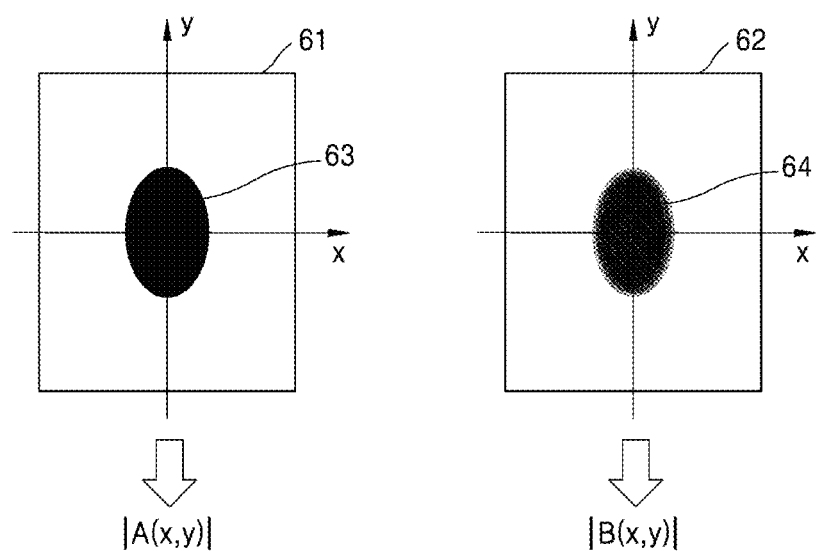
FIG. 6A is a diagram for explaining a method of obtaining a first predefined amplitude data and a second predefined amplitude data, according to an embodiment.

FIG. 6A is a diagram for explaining a method of obtaining a first predefined amplitude data and a second predefined amplitude data based on first and second 2D images 61 and 62, according to an embodiment.

A first object image 61 is a 2D image corresponding to the first depth layer. First predefined amplitude data $|A(x,y)|$ may be obtained based on the first object image 61.

A second object image 62 is a 2D image corresponding to the second depth layer. Second predefined amplitude data $|B(x,y)|$ may be obtained based on the second object image 62.

The first object image 61 and the second object image 62 may be 2D images obtained from a single object. Alternatively, the first object image 61 and the second object image 62 may be 2D images obtained from different objects.

In an embodiment, the first object image 61 may be an image in which an object 63 is located within a predefined depth of field, and the second object image 62 may be an image in which an object 64 is located outside the predefined depth of field. Alternatively, the first object image 61 and the second object image 62 may be images in which both of the objects 63 and 64 are located within or outside the depth of field. The depth of field may be arbitrarily set. The object 63 and the object 64 may be the same as or different from each other.

In embodiments, the first object image 61 may be an image in which the object 63 is focused, and the second object image 62 may be an image in which the object 64 is not focused. Alternatively, the first object image 61 and the second object image 62 may be images in which both of the objects 63 and 64 are focused or not focused. The object 63 and the object 64 may be the same as or different from each other.

In an embodiment, the first object image 61 may be an image to be displayed from the first depth layer, and the second object image 62 may be an image to be displayed from the second depth layer.

The second object image 62 may be generated from the first object image 61. The second object image 62 may be generated by changing values of pixels in the first object image 61. For example, the second object image 62 may be generated by blurring the first object image 61 or by rendering the first object image 61.

The first and second object images 61 and 62 may include color data, such as RGB and YUV, and amplitude values of light may be obtained from the color data.

The processor 112 (shown in FIG. 5) may obtain the first predefined amplitude data $|A(x,y)|$ by obtaining the amplitude values of the light from the first object image 61. In addition, the processor 112 may obtain the second predefined amplitude data $|B(x,y)|$ by obtaining amplitude values of light from the second object image 62.

Figure 6B:
FIGS. 6B and 6C are diagrams for explaining a method of obtaining a first predefined amplitude data and a second predefined amplitude data according to an embodiment.
Figure 6C:
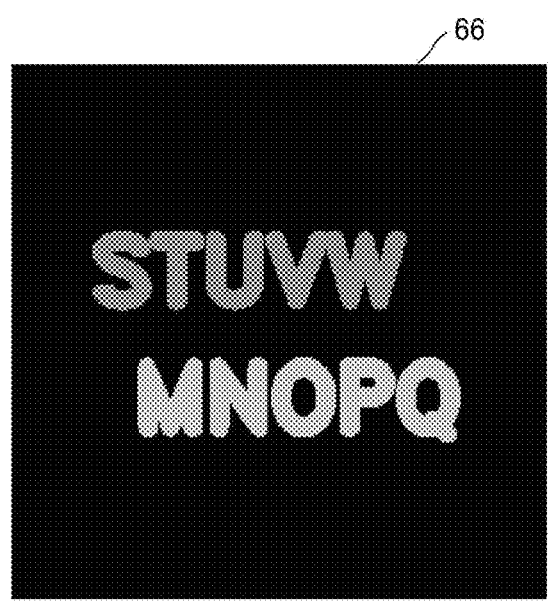

FIGS. 6B and 6C are diagrams for explaining a method of obtaining a first predefined amplitude data and a second predefined amplitude data according to an embodiment.

A first object image 65 and a second object image 66 shown in FIGS. 6B and 6C, respectively, may be images in which different objects are captured. In FIGS. 6B, a string "GHIJKLABCDEF" corresponding to a first object is shown and in FIG. 6C, a string "STUVWMNOPQ" corresponding to a second object is shown.

The first and second object images 65 and 66 may not be physically related to each other. For example, the first object image 65 and the second object image 66 may be images in which different objects are independently captured.

Referring to FIGS. 6B and 6C, the first object image 65 is a 2D image for obtaining first predefined amplitude data $|A(x,y)|$ for the first object in the first depth layer. The second object image 66 is a 2D image for obtaining second predefined amplitude data $|B(x,y)|$ for the second object in the second depth layer.

In an embodiment, the first object image 65 and the second object image 66 may be images in which the objects are expressed where focal lengths of the eye lens are equal to or different from each other.

In an embodiment, the first object image 65 may be an image in which the first object is located within a depth of field for the first depth layer, and the second object image 66 may be an image in which the second object is located within a depth of field for the second depth layer. Alternatively, the first object image 65 may be an image in which the first object is located within the depth of field for the first depth layer, and the second object image 66 may be an image in which the second object is located outside the depth of field for the second depth layer. Alternatively, the first object image 65 may be an image in which the first object is located outside the depth of field for the first depth layer, and the second object image 66 may be an image in which the second object is located outside the depth of field for the second depth layer. The depth of field may be arbitrarily set.

In an embodiment, the first object image 65 and the second object image 66 may be images in which the first and second objects are focused. Alternatively, the first object image 65 may be an image in which the first object is focused, and the second object image 66 may be an image in which the second object 66 is not focused. Alternatively, the first object image 65 and the second object image 66 may be images in which both the first and second objects are not focused.

In an embodiment, the first object image 65 may be an image to be output from the first depth layer, and the second object image 66 may be an image to be output from the second depth layer.

The processor 112 (shown in FIG. 5) may obtain the first predefined amplitude data $|A(x,y)|$ by obtaining amplitude values of light from the first object image 65. In addition, the processor 112 may obtain the second predefined amplitude data $|B(x,y)|$ by obtaining amplitude values of light from the second object image 66.

Figure 7:
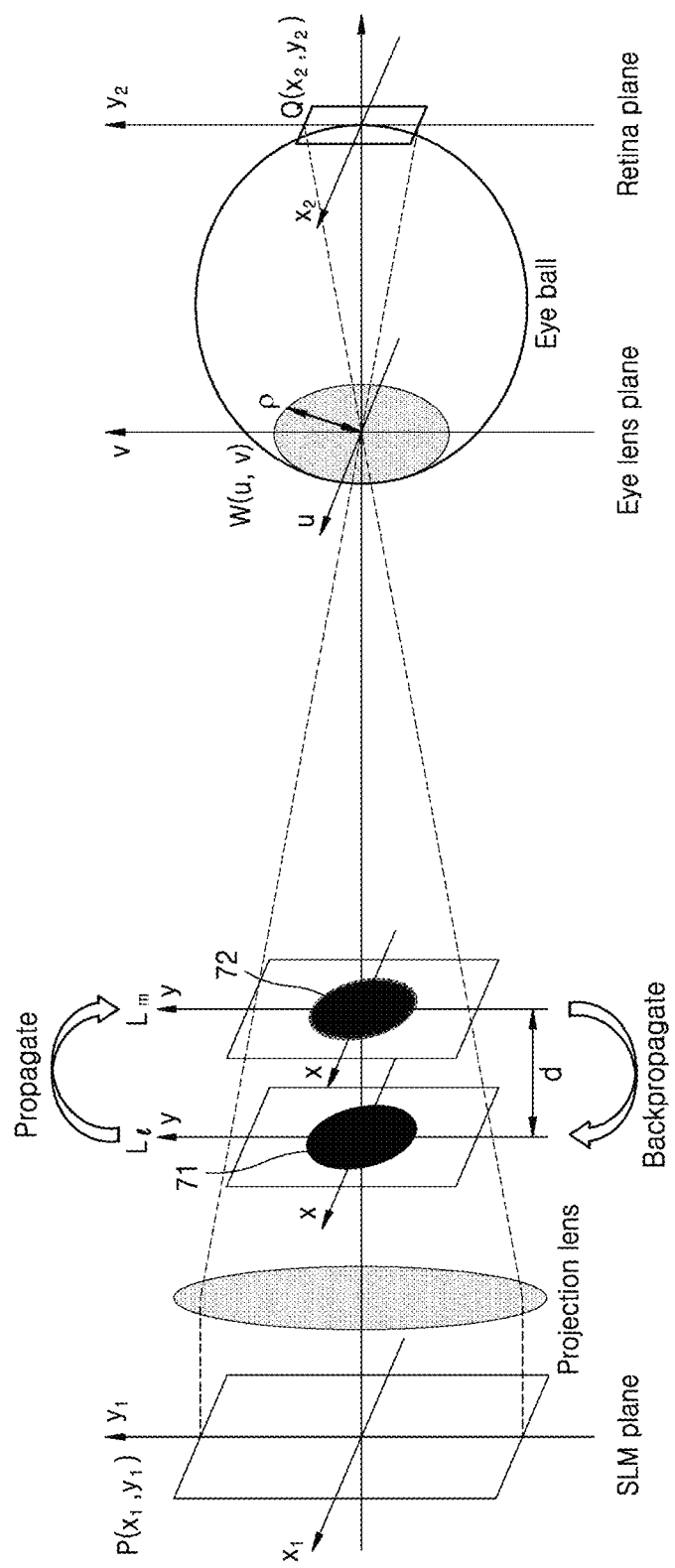
FIG. 7 is a diagram for explaining propagation of object data according to an embodiment.

FIG. 7 is a diagram for explaining propagating of object data according to an embodiment.

The object data includes information about an amplitude and a phase of light. Amplitude data of the object data includes information about an intensity of light. An image in a depth layer may be generated based on the amplitude data of the object data in the depth layer. In other words, phase data of the object data are not necessary to generate an image in a depth layer. Phase data of the object data includes information about propagation (for example, propagation direction) of light. An image in another depth layer may be generated based on the amplitude data and the phase data of the object data in any one depth layer.

Amplitude data and phase data of the object data in other layers may be obtained by propagating or back-propagating the object data from any one layer.

By propagating first object data 71 from a first depth layer $L_l$ to a second depth layer $L_m$, amplitude data and phase data of second object data 72 may be obtained. By back-propagating second object data 72 from the second depth layer $L_m$ to the first depth layer $L_l$, amplitude data and phase data of the first object data 71 may be obtained.

FIGS. 8A-8E are diagrams for explaining a method of obtaining a phase of object data according to an embodiment.

The processor 112 (shown in FIG. 5) may set initial amplitude data of first object data 801 to the first predefined amplitude data $|A(x,y)|$. The processor 112 may set initial phase data of the first object data 801 to randomized phase data $p_{n=1}(x, y)$.

The processor 112 may obtain amplitude data $|B'(x,y)|$ and phase data $q_{n=1}(x,y)$ of second object data 802 by propagating the first object data 801 from the first depth layer to the second depth layer. The processor 112 may propagate the first object data 801 from the first depth layer to the second depth layer to obtain the second object data 802 by performing a Fourier transform (for example, a fast Fourier transform FFT) on the first object data 801 based on a distance d between the first depth layer and the second depth layer.

The processor 112 may change the amplitude data $|B'(x,y)|$ of the second object data 802 to the second predefined amplitude data $|B(x,y)|$.

FIG. 8C shows an example of a holographic image generated from the second object data 802 having the amplitude data $|B'(x,y)|$, and FIG. 8D shows an example of a holographic image generated from changed second object data 803 having the second predefined amplitude data $|B(x,y)|$.

The processor 112 may obtain amplitude data $|A'(x,y)|$ and phase data $p_{n=2}(x,y)$ of first object data 804 by back-propagating the second object data 803 from the second depth layer to the first depth layer. The processor 112 may back-propagate the second object data 803 from the second depth layer to the first depth layer to obtain the first object data 804 by performing an inverse Fourier transform (for example, an inverse fast Fourier transform $FFT^{-1}$) on the second object data 803 based on the distance d between the first depth layer and the second depth layer.

The processor 112 may then change the amplitude data $|A'(x,y)|$ of the first object data 804 to the first predefined amplitude data $|A(x,y)|$.

FIG. 8E shows an example of a holographic image generated from the first object data 804 having the amplitude data $|A'(x,y)|$, and FIG. 8B shows an example of a holographic image generated from the changed first object data 801 having the first predefined amplitude data $|A(x,y)|$.

Figure 8A:
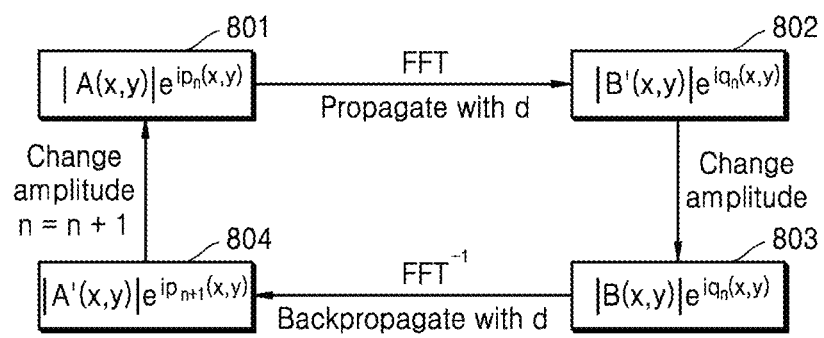

The processor 112 may obtain final first object data by repeatedly performing the loop illustrated in FIG. 8A a predefined number of times while incrementing n.

The processor 112 may determine final phase data as being phase data $p_{n=N+1}(x,y)$ of the final first object data obtained by repeating, a predefined number of times N, the loop illustrated in FIG. 8A.

Alternatively, the processor 112 may determine the final phase data as $p_{n=M+1}(x,y)$ obtained by repeatedly performing, M times, the loop illustrated in FIG. 8A, based on a comparison between the amplitude data $|A'(x,y)|$ of the first object data 804 in the first depth layer and the first predefined amplitude data $|A(x,y)|$. For example, the processor 112 may repeatedly perform, M times, the loop illustrated in FIG. 8A until a difference between the amplitude data $|A'(x,y)|$ of the first object data 804 and the first predefined amplitude data $|A(x,y)|$ is less than a predefined threshold value. In this case, the number of times M depends on the difference between the amplitude value $|A'(x,y)|$ of the object data 804 in the first depth layer and the first target amplitude value $|A(x,y)|$.

Alternatively, the processor 112 may determine the final phase data as being phase data $p_{n=T+1}(x,y)$ of the first object data obtained by repeatedly performing, T times, the loop illustrated in FIG. 8A, based on a comparison between the amplitude data $|B'(x,y)|$ of the second object data 802 and the second predefined amplitude data $|B(x,y)|$. For example, the processor 112 may repeatedly perform, T times, the loop illustrated in FIG. 8A until a difference between the amplitude data $|B'(x,y)|$ of the second object data 802 and the second predefined amplitude data $|B(x,y)|$ is less than a predefined threshold value. In this case, the number of times T depends on the difference between the amplitude value $|B'(x,y)|$ of the object data 802 in the second depth layer and the second target amplitude value $|B(x,y)|$.

Figure 9A:
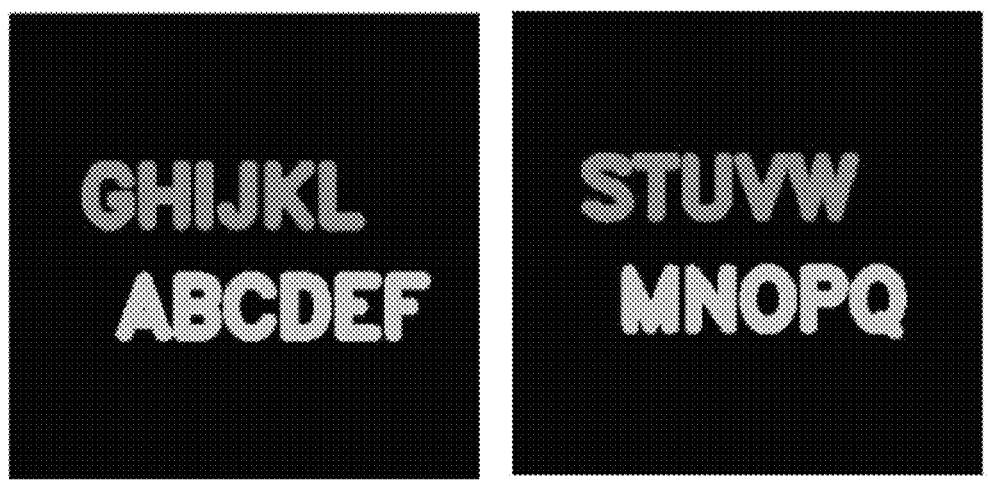
FIGS. 9A and 9B are diagrams of holographic images generated according to the method of FIG. 8A.
Figure 9B:
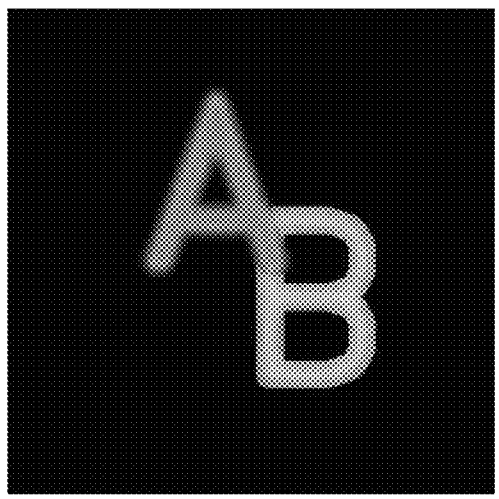
Figure 9B:
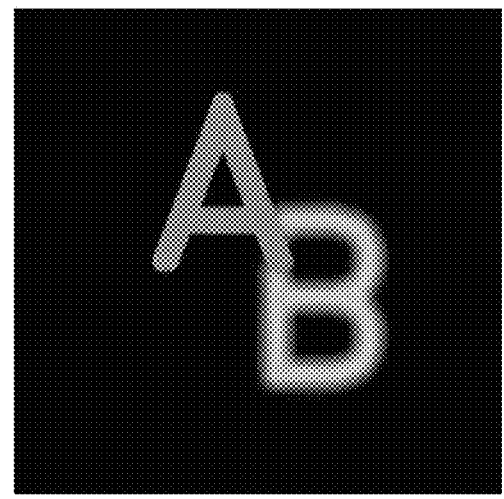

FIGS. 9A and 9B are diagrams of holographic images generated according to the method of FIG. 8A.

The left image of FIG. 9A is a holographic image in the first depth layer, and the right image is a holographic image in the second depth layer.

A CGH having the first predefined amplitude data and the second predefined amplitude data, respectively, may be generated by the method of FIG. 9A. The display apparatus 150 (shown in FIG. 5) may display holographic images having the first predefined amplitude data and the second predefined amplitude data, respectively, based on the CGH. Accordingly, the holographic image having the first predefined amplitude data may be displayed on the first depth layer, and the holographic image having the second predefined amplitude data may be displayed on the second depth layer. That is, the first object image may be displayed by the holographic image on the first depth layer, and the second object image may be displayed by the holographic image on the second depth layer.

The holographic images shown in FIG. 9A are holographic images generated by using the first and second object images illustrated in FIGS. 6B and 6C, and it may be confirmed that the holographic images are displayed with desired intensities of light in the first depth layer and the second depth layer, respectively.

In FIG. 9B, the left image is a holographic image on the first depth layer, and the right image is a holographic image on the second depth layer.

Since the final phase data of the first object data may be determined to satisfy the first predefined amplitude data and the second predefined amplitude data, holographic images may be expressed with desired intensities of light in the first depth layer and the second depth layer, respectively. Accordingly, black dots may be prevented from being generated in the image, and the extent to which the image appears blurred may be prevented from being irregular.

Figure 10:
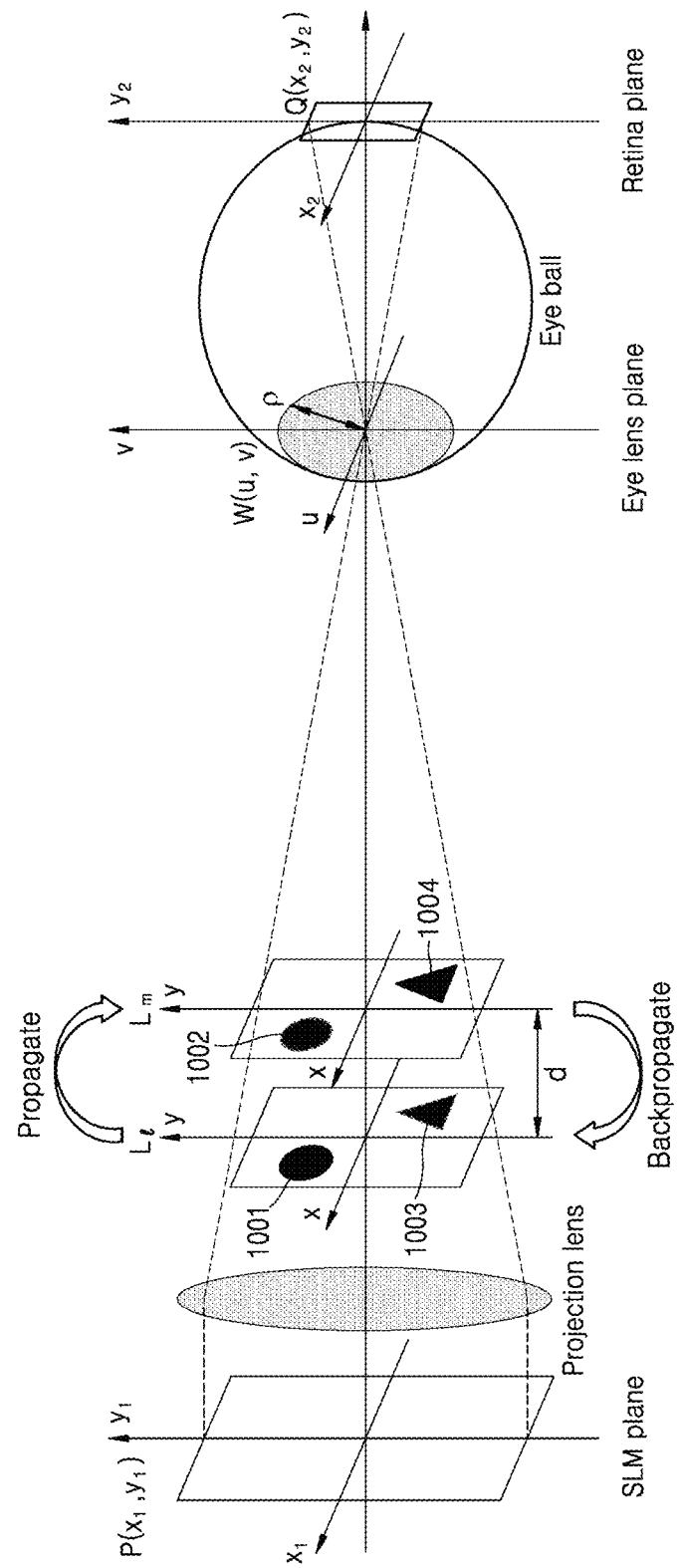
FIG. 10 is a diagram for explaining propagation of object data according to an embodiment.

FIG. 10 is a diagram for explaining propagating of object data according to an embodiment.

A target to be generated into a holographic image may be a plurality of objects. FIG. 10 shows first and second object data 1001 and 1002 and third and fourth object data 1003 and 1004 for two objects, respectively, according to an embodiment.

The processor 112 (shown in FIG. 5) may obtain amplitude data and phase data of the second object data 1002 by propagating the first object data 1001 from the first depth layer $L_l$ to the second depth layer $L_m$. Similarly, the processor 112 may obtain amplitude data and phase data of the fourth object data 1004 by propagating the third object data 1003 from the first depth layer $L_l$ to the second depth layer $L_m$.

Only pixels corresponding to the first object data 1001 may be considered in a process of propagating the first object data 1001, and only pixels corresponding to the third object data 1003 may be considered in a process of propagating the third object data 1003. Accordingly, the first object data 1001 and the third object data 1003 may be independently propagated.

Similarly, only pixels corresponding to the second object data 1002 may be considered in a process of back-propagating the second object data 1002, and only pixels corresponding to the fourth object data 1004 may be considered in a process of back-propagating the fourth object data 1004. Accordingly, the second object data 1002 and the fourth object data 1004 may be independently back-propagated.

Accordingly, the processor 112 may perform processes of propagating and back-propagating the first and second object data 1001 and 1002 and the third and fourth object data 1003 and 1004 in parallel, and may reduce calculation times.

Figure 11:
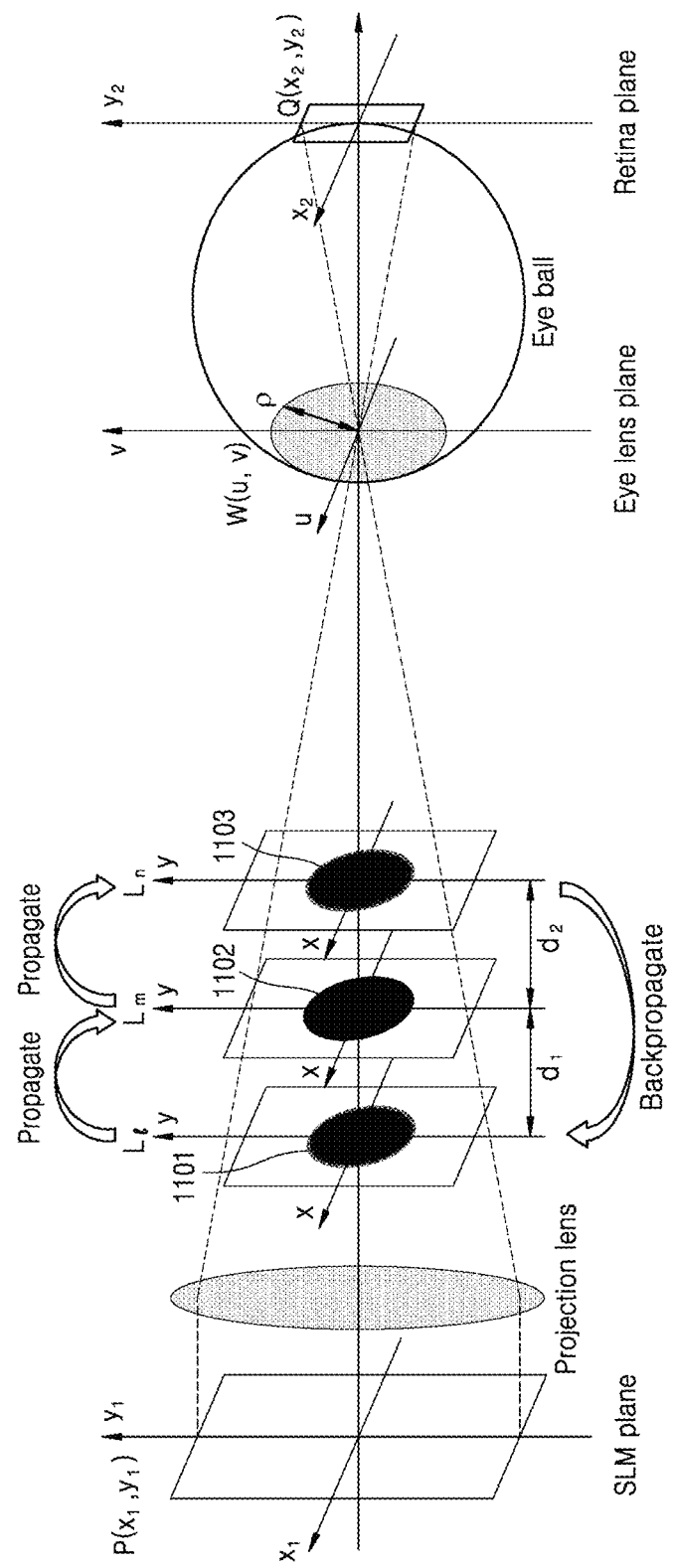
FIG. 11 is a diagram for explaining propagation of object data according to an embodiment.

FIG. 11 is a diagram for explaining propagating of object data according to an embodiment.

The object data may be propagated or back-propagated between two or more depth layers. FIG. 11 shows object data that is propagated or back-propagated between three depth layers.

The three depth layers $L_l$, $L_m$, and $L_n$ may be arbitrary depth layers. A distance d1 between the first depth layer $L_l$ and the second depth layer $L_m$ and a distance d2 between the second depth layer $L_m$ and the third depth layer $L_n$ may be equal to or different from each other.

By propagating first object data 1101 from the first depth layer $L_l$ to the second depth layer $L_m$, amplitude data and phase data of second object data 1102 may be obtained. By propagating the second object data 1102 from the second depth layer $L_m$ to the third depth layer $L_n$, amplitude data and phase data of third object data 1103 may be obtained. By back-propagating the third object data 1103 from the third depth layer $L_n$ to the first depth layer $L_l$, amplitude data and phase data of the first object data 1101 may be obtained.

Figure 12:
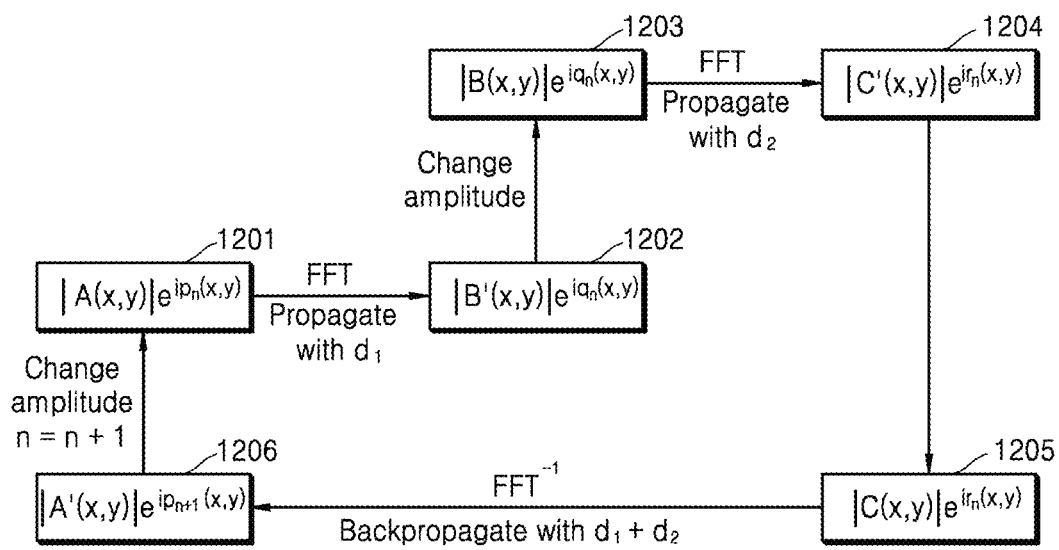
FIG. 12 is a diagram for explaining a method of obtaining a phase of object data according to an embodiment.

FIG. 12 is a diagram for explaining a method of obtaining a phase of object data according to an embodiment.

The processor 112 (shown in FIG. 5) may set initial amplitude data of first object data 1201 to the first predefined amplitude data $|A(x,y)|$. The processor 112 may set initial phase data of the first object data 1201 to randomized phase data $p_{n=1}(x, y)$.

The processor 112 may obtain amplitude data $|B'(x,y)|$ and phase data $q_{n=1}(x,y)$ of second object data 1202 by propagating the first object data 1201 from the first depth layer to the second depth layer. The processor 112 may propagate the first object data 1201 from the first depth layer to the second depth layer by performing a Fourier transform on the first object data 1201 based on a distance d1 between the first depth layer and the second depth layer.

The processor 112 may change the amplitude data $|B'(x,y)|$ of the second object data 1202 to the second predefined amplitude data $|B(x,y)|$ to obtain second object data 1203.

The processor 112 may obtain amplitude data $|C'(x,y)|$ and phase data $r_{n=1}(x,y)$ of third object data 1204 by propagating second object data 1203 from the second depth layer to the third depth layer.

The processor 112 may change the amplitude data $|C'(x,y)|$ of the third object data 1204 to predefined third amplitude data $|C(x,y)|$ to obtain third object data 1205.

The processor 112 may obtain amplitude data $|A'(x,y)|$ and phase data $p_{n=2}(x,y)$ of first object data 1206 by back-propagating third object data 1205 from the third depth layer to the first depth layer.

The processor 112 may change the amplitude data $|A'(x,y)|$ of the object data 1206 to the first predefined amplitude data $|A(x,y)|$ to obtain changed first object data 1201.

The processor 112 may obtain final phase data of final first object data by repeatedly performing the loop illustrated in FIG. 12 while incrementing n. In other words, the loop of FIG. 12 may be performed n times wherein each iteration of the loop receives as input the changed first object data output by the preceding iteration.

The processor 112 may determine the final phase data as $p_{n=N+1}(x,y)$ of the first object data obtained by repeatedly performing, a predefined number of times N, the loop illustrated in FIG. 12.

Alternatively, the processor 112 may determine the final phase data as $p_{n=M+1}(x,y)$ of the first object data obtained by repeatedly performing, M times, the loop illustrated in FIG. 12, based on a comparison between the amplitude data $|A'(x,y)|$ of the first object data 1206 and the first predefined amplitude data $|A(x,y)|$. In other words, the processor 112 may determine whether to perform, or to refrain from performing, another iteration of the loop of FIG. 12 based on the comparison between the amplitude data $|A'(x,y)|$ of the first object data 1206 in the first depth layer and the first predefined amplitude data $|A(x,y)|$.

Alternatively, the processor 112 may determine the final phase data as being phase data $p_{n=T+1}(x,y)$ of the first object data obtained by repeatedly performing, T times, the loop illustrated in FIG. 12, based on a comparison between the amplitude data $|B'(x,y)|$ of the second object data 1202 and the second predefined amplitude data $|B(x,y)|$. In other words, the processor 112 may determine whether to perform, or to refrain from performing, another iteration of the loop of FIG. 12 based on the comparison between the amplitude data $|B'(x,y)|$ of the second object data 1202 in the second depth layer and the second predefined amplitude data $|B(x,y)|$.

Alternatively, the processor 112 may determine the final phase data as being phase data $p_{n=S+1}(x,y)$ of the first object data obtained by repeatedly performing, S times, the loop illustrated in FIG. 12, based on a comparison between the amplitude data $|C'(x,y)|$ of the third object data 1204 and the third predefined amplitude data $|C(x,y)|$. In other words, the processor 112 may determine whether to perform, or to refrain from performing, another iteration of the loop of FIG. 12 based on the comparison between the amplitude data $|C'(x,y)|$ of the third object data 1204 in the third depth layer and the third predefined amplitude data $|C(x,y)|$.

A structure of a loop for obtaining the final phase data is not limited to the structure of the loop illustrated in FIG. 12. In an embodiment, the loop may be configured to propagate the first object data from the first depth layer to the third depth layer, then to back-propagate the third object data from the third depth layer to the second depth layer, and then to back-propagate the second object data from the second depth layer to the first depth layer.

Figure 13:
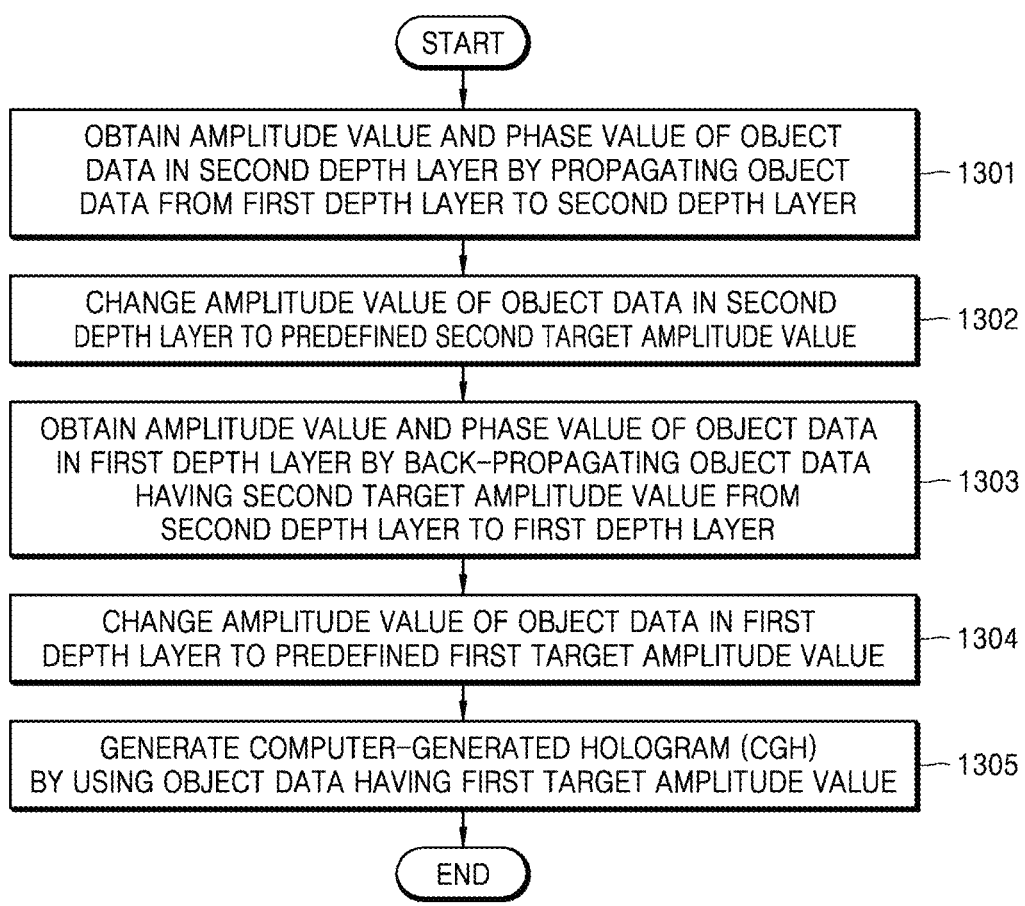
FIG. 13 is a flow chart of a method of generating a CGH using object data according to an embodiment.

FIG. 13 is a flow chart of a method of generating a CGH using object data according to an embodiment.

In operation 1301, the processor 112 (shown in FIG. 5) may obtain the amplitude value and the phase value of the object data in the second depth layer by propagating the object data from the first depth layer to the second depth layer. The processor 112 may propagate the object data by performing a Fourier transform on the object data based on a distance between the first depth layer and the second depth layer.

In operation 1302, the processor 112 may change the amplitude value of the object data in the second depth layer to a predefined second target amplitude value.

In operation 1303, the processor 112 may obtain the amplitude value and the phase value of the object data in the first depth layer by back-propagating the object data having the second target amplitude value from the second depth layer to the first depth layer. The processor 112 may back-propagate the object data by performing an inverse Fourier transform on the object data based on the distance between the first depth layer and the second depth layer.

In operation 1304, the processor 112 may generate changed object data by changing the amplitude value of the object data in the first depth layer to a predefined first target amplitude value.

In operation 1305, the processor 112 may generate a CGH by using the changed object data having the predefined first target amplitude value. The final amplitude value may be determined to be the first target amplitude value, and the final phase value may be determined to be the phase value in the first depth layer. The processor 112 may generate the CGH using the changed object data having the final amplitude value and the final phase value.

Figure 14:
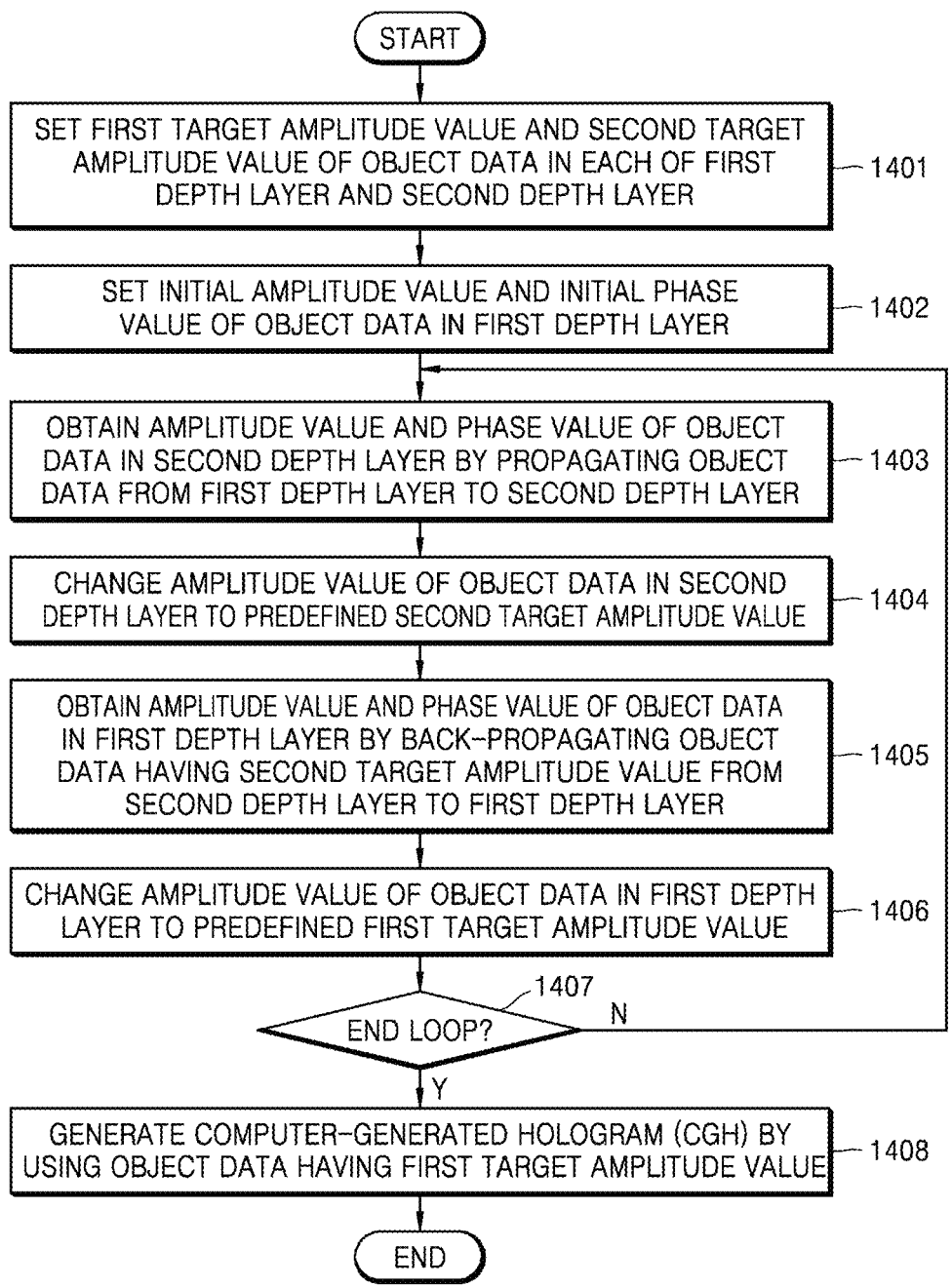
FIG. 14 is a flow chart of a method of generating a CGH using object data according to an embodiment.

FIG. 14 is a flow chart of a method of generating a CGH using object data according to an embodiment.

In operation 1401, the processor 112 (shown in FIG. 5) may set the first target amplitude value and the second target amplitude value of the object data in each of the first depth layer and the second depth layer. The first target amplitude value and the second target amplitude value may be obtained from pre-generated first and second images, respectively.

In operation 1402, the processor 112 may set the initial amplitude value and the initial phase value of the object data in the first depth layer. The initial amplitude value may be set to be the first target amplitude value, and the initial phase value may be set to be an arbitrary phase value.

In operation 1403, the processor 112 may obtain the amplitude value and the phase value of the object data in the second depth layer by propagating the object data from the first depth layer to the second depth layer.

In operation 1404, the processor 112 may change the amplitude value of the object data in the second depth layer to a predefined second target amplitude value.

In operation 1405, the processor 112 may obtain the amplitude value and the phase value of the object data in the first depth layer by back-propagating the object data having the second target amplitude value from the second depth layer to the first depth layer. That is, in operation 1405, the amplitude value and the phase value of the object data in the first depth layer may be updated.

In operation 1406, the processor 112 may generate changed object data by changing the amplitude value of the object data in the first depth layer to a predefined first target amplitude value.

In operation 1407, the processor 112 may determine whether to repeatedly perform operations 1403 to 1406. The processor 112 may determine to proceed to operation 1408 based on the result of the determination at operation 1407. For example, the determination at operation 1407 may be made based on the number of times that operations 1403 to 1406 have been repeatedly performed. Alternatively, the processor 112 may determine to proceed to operation 1408 based on a comparison of the amplitude value of the changed object data in the first depth layer of operation 1405 and the first target amplitude value. Alternatively, the processor 112 may determine to proceed to operation 1408 based on a comparison of the amplitude value of the object data in the second depth layer of operation 1403 and the second target amplitude value.

In operation 1408, the processor 112 may generate a CGH by using the changed object data having the first target amplitude value. The final amplitude value may be determined to be the first target amplitude value, and the final phase value may be determined to be the phase value in the first depth layer finally obtained by repeating operations 1403 to 1406. The processor 112 may generate the CGH using the object data having the final amplitude value and the final phase value.

Figure 15:
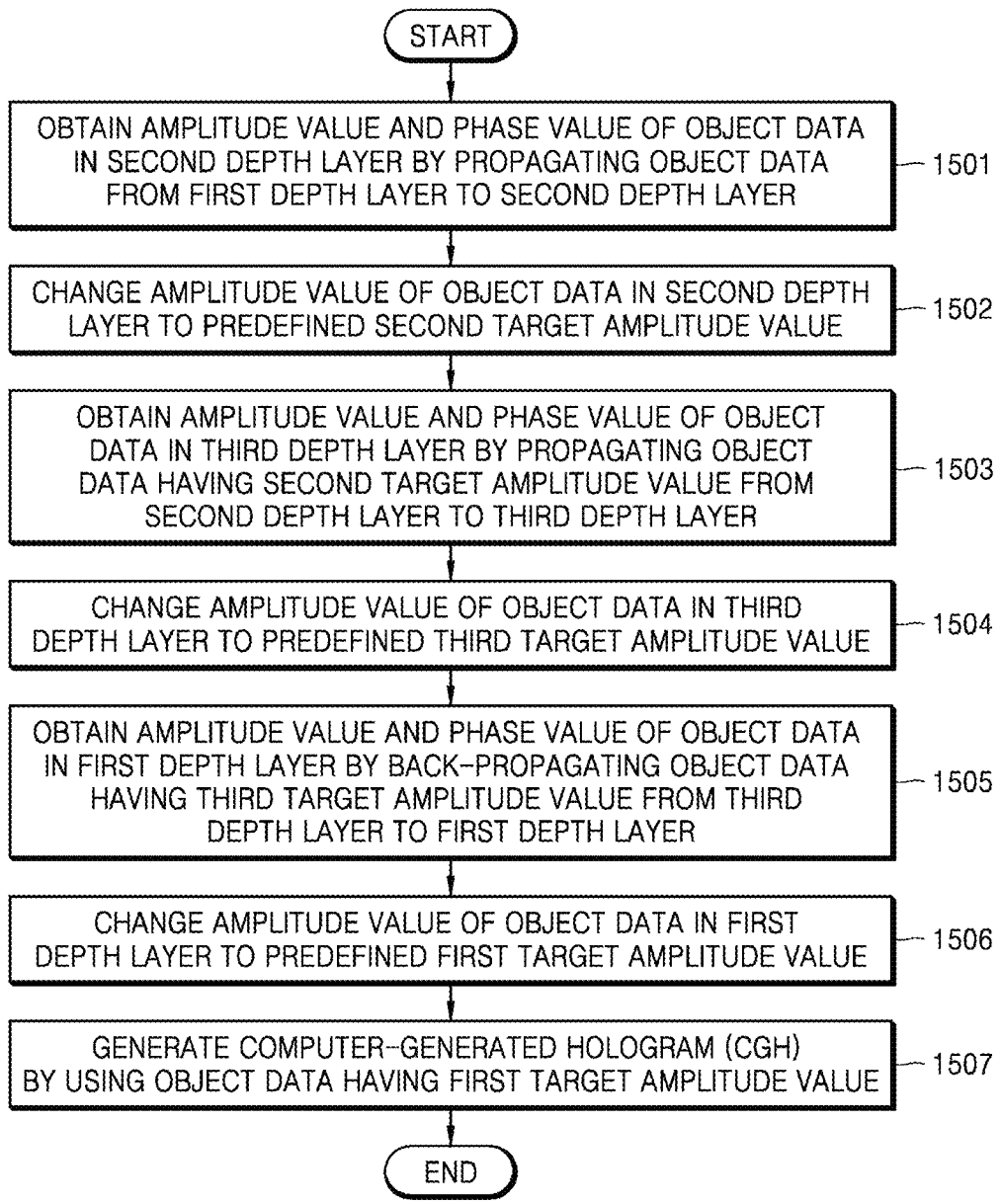
FIG. 15 is a flow chart of a method of generating a CGH using object data according to an embodiment.

FIG. 15 is a flow chart of a method of generating a CGH using object data according to an embodiment.

In operation 1501, the processor 112 (shown in FIG. 5) may obtain the amplitude value and the phase value of the object data in the second depth layer by propagating the object data from the first depth layer to the second depth layer. In an embodiment, operation 1501 may be substituted with an operation of propagating the object data from the first depth layer to the third depth layer.

In operation 1502, the processor 112 may change the amplitude value of the object data in the second depth layer to a predefined second target amplitude value. In an embodiment, operation 1502 may be substituted with an operation of changing the amplitude value of the object data in the third depth layer to a predefined third target amplitude value.

In operation 1503, the processor 112 may obtain the amplitude value and the phase value of the object data in the third depth layer by propagating the object data having the second target amplitude value from the second depth layer to the third depth layer. In an embodiment, operation 1503 may be substituted with an operation of back-propagating the object data from the third depth layer to the second depth layer.

In operation 1504, the processor 112 may change the amplitude value of the object data in the third depth layer to the predefined third target amplitude value. In an embodiment, operation 1504 may be substituted with an operation of changing the amplitude value of the object data in the second depth layer to the predefined second target amplitude value.

In operation 1505, the processor 112 may obtain the amplitude value and the phase value of the object data in the first depth layer by back-propagating the object data having the third target amplitude value from the third depth layer to the first depth layer. In an embodiment, operation 1505 may be substituted with an operation of back-propagating the object data from the second depth layer to the first depth layer.

In operation 1506, the processor 112 may generate changed object data by changing the amplitude value of the object data in the first depth layer to the predefined first target amplitude value.

In operation 1507, the processor 112 may generate a CGH by using the changed object data having the predefined first target amplitude value.

Figure 16:
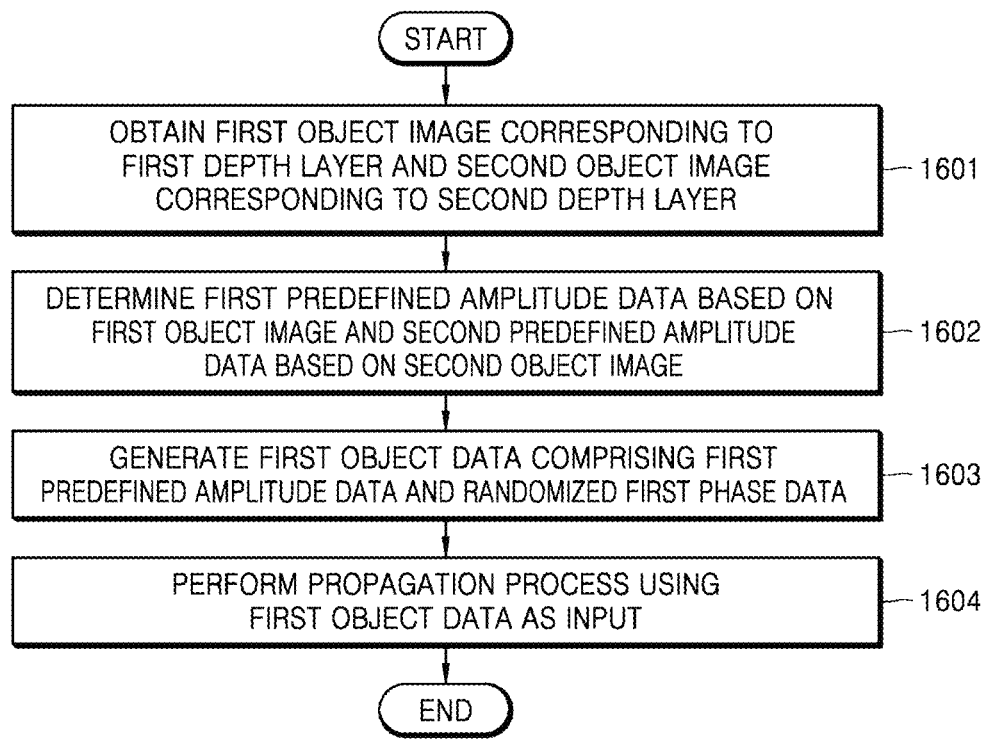
FIG. 16 is a flow chart of a method of processing a CGH, according to an embodiment.

FIG. 16 is a flow chart of a method of processing a CGH, according to an embodiment.

In operation 1601, the CGH generation apparatus 100 (shown in FIG. 5) may obtain a first object image corresponding to a first depth layer, and a second object image corresponding to a second depth layer. The CGH generation apparatus 100 may generate or obtain the first and second object images independently. Alternatively, the CGH generation apparatus 100 may generate the first object image and then generate the second object image by modifying the first object image.

In operation 1602, the CGH generation apparatus 100 may determine first predefined amplitude data based on the first object image and second predefined amplitude data based on the second object image.

In operation 1603, the CGH generation apparatus 100 may generate first object data comprising the first predefined amplitude data and randomized first phase data.

In operation 1604, the CGH generation apparatus 100 may perform a propagation process using the first object data as an input.

The propagation process may include propagating the first object data to a second depth layer to obtain second object data including second amplitude data and second phase data. The first object data may be propagated by performing an FFT on the first object data. In addition, the propagation process may further include changing the second amplitude data to the second predefined amplitude data to obtain changed second object data.

The propagation process may further include back-propagating the changed second object data to the first depth layer to obtain changed first object data including changed first amplitude data and changed first phase data. The changed second object data may be back-propagated by performing an inverse FFT on the changed second object data.

The propagation process may further include changing, to the first predefined amplitude data, the changed first amplitude data included in the changed first object data to obtain final first object data.

The CGH generation apparatus 100 may generate a CGH based on the final first object data.

The display apparatus 150 (shown in FIG. 5) may display holographic images having the first predefined amplitude data and the second predefined amplitude data, respectively, based on the CGH. The display apparatus 150 may display the holographic image having the first predefined amplitude data on the first depth layer, and display the holographic image having the second predefined amplitude data on the second depth layer. In this case, the display apparatus 150 is regarded as an ideal device without aberrations or the like. Accordingly, the first object image may be displayed by the holographic image on the first depth layer, and the second object image may be displayed by the holographic image on the second depth layer.

Embodiments described above may be written in a program that may be executed on a computer and implemented on a general-purpose digital computer that operates the program using a non-transitory computer-readable recording medium. Also, the structure of the data used in embodiments may be recorded on a non-transitory computer-readable recording medium via various units. Examples of the non-transitory computer-readable recording medium include magnetic storage media (e.g., ROM, floppy disks, hard disks, etc.), optical recording media (e.g., CD-ROMs, or DVDs), etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method for processing a computer-generated hologram (CGH), the method comprising:
    obtaining a first object image corresponding to a first depth layer and a second object image corresponding to a second depth layer;
    determining first predefined amplitude data based on the first object image and second predefined amplitude data based on the second object image;
    generating first object data comprising the first predefined amplitude data and randomized first phase data; and
    performing a propagation process using the first object data as an input, the propagation process comprising:
        propagating the first object data to the second depth layer to obtain second object data comprising second amplitude data and second phase data;
        replacing the second amplitude data with the second predefined amplitude data to obtain changed second object data;
        back-propagating the changed second object data to the first depth layer to obtain changed first object data comprising changed first amplitude data and changed first phase data; and
        replacing the changed first amplitude data included in the changed first object data with the first predefined amplitude data to obtain final first object data,
    wherein the method further comprises:
        generating a CGH based on the final first object data; and
        displaying a first holographic image comprising the first predefined amplitude data and a second holographic image comprising the second predefined amplitude data based on the CGH.

2. The method of claim 1, further comprising:
    performing the propagation process a predefined number of times using the final first object data of a preceding iteration of the propagation process as the input before the generating of the CGH.

3. The method of claim 1, wherein the propagation process further comprises:
    determining a difference between the changed first amplitude data and the first predefined amplitude data; and
    repeating the propagation process using the final first object data of a preceding iteration of the propagation process as the input based on the determined difference being greater than or equal to a predefined threshold value.

4. The method of claim 1, wherein the propagation process further comprises:
    determining a difference between the changed second amplitude data and the second predefined amplitude data; and repeating the propagation process using the final first object data of a preceding iteration of the propagation process as the input based on the determined difference being greater than or equal to a predefined threshold value.

5. The method of claim 1, wherein the propagating of the first object data comprises performing a fast Fourier transform (FFT) on the first object data, and
wherein the back-propagating of the changed second object data comprises performing an inverse FFT on the changed second object data.

6. The method of claim 1, wherein the obtaining of the first object image and the second object image comprises:
obtaining the first object image of a first object; and
obtaining the second object image of a second object different from the first object.

7. The method of claim 1, wherein the obtaining of the first object image and the second object image comprises:
obtaining the first object image; and
obtaining the second object image by changing values of pixels of the first object image.

8. The method of claim 1, wherein the obtaining of the first object image and the second object image comprises:
obtaining the first object image in which an object is located within a predefined depth of field; and
obtaining the second object image in which the object is located outside the predefined depth of field.

9. The method of claim 1, wherein the displaying of the first holographic image and the second holographic image comprises:
displaying, on the first depth layer, the first holographic image having the first predefined amplitude data; and
displaying, on the second depth layer, the second holographic image having the second predefined amplitude data.

10. A non-transitory computer-readable recording medium having recorded thereon a program for executing the method of claim 1 on a computer.

11. A system for processing a computer-generated hologram (CGH), the system comprising:
a CGH generation apparatus configured to generate a CGH; and
a display apparatus configured to display the CGH,
wherein the CGH generation apparatus is further configured to:
obtain a first object image corresponding to a first depth layer and a second object image corresponding to a second depth layer,
determine first predefined amplitude data based on the first object image and second predefined amplitude data based on the second object image,
generate first object data comprising the first predefined amplitude data and randomized first phase data, and
perform a propagation using the first object data as an input,
wherein the propagation comprises:
propagating the first object data to the second depth layer to obtain second object data comprising second amplitude data and second phase data;
replacing the second amplitude data with the second predefined amplitude data to obtain changed second object data;
back-propagating the changed second object data to the first depth layer to obtain changed first object data comprising changed first amplitude data and changed first phase data; and
replacing the changed first amplitude data included in the changed first object data with the first predefined amplitude data to obtain final first object data, and
wherein the CGH generation apparatus is further configured to generate the CGH based on the final first object data, and display a first holographic image comprising the first predefined amplitude data and a second holographic image comprising the second predefined amplitude data by using the CGH.

12. The system of claim 11, wherein the CGH generation apparatus is further configured to perform the propagation a predefined number of times using the final first object data of a preceding iteration of the propagation as the input before the generating of the CGH.

13. The system of claim 11, wherein the propagation further comprises:
determining a difference between the changed first amplitude data and the first predefined amplitude data; and
repeating the propagation using the final first object data of a preceding iteration of the propagation as the input based on the determined difference being greater than or equal to a predefined threshold value.

14. The system of claim 11, wherein the propagation further comprises:
determining a difference between the changed second amplitude data and the second predefined amplitude data; and
repeating the propagation using the final first object data of a preceding iteration of the propagation as the input based on the determined difference being greater than or equal to a predefined threshold value.

15. The system of claim 11, wherein the propagating of the first object data comprises performing a fast Fourier transform (FFT) on the first object data, and
wherein the back-propagating of the changed second object data comprises performing an inverse FFT on the changed second object data.

16. The system of claim 11, wherein the CGH generation apparatus is further configured to obtain the first object image of a first object, and obtain the second object image of a second object different from the first object.

17. The system of claim 11, wherein the CGH generation apparatus is further configured to obtain the first object image, and obtain the second object image by changing values of pixels of the first object image.

18. The system of claim 11, wherein the CGH generation apparatus is further configured to obtain the first object image in which an object is located within a predefined depth of field, and obtain the second object image in which the object is located outside the predefined depth of field.

19. The system of claim 11, wherein the display apparatus is further configured to display, on the first depth layer, the first holographic image comprising the first predefined amplitude data, and display, on the second depth layer, the second holographic image comprising the second predefined amplitude data.

* * * * *